(12) United States Patent
Arimoto (10) Patent No.: US 11,674,347 B2
(45) Date of Patent: Jun. 13, 2023

(54) GLASS LIFT PLATE ASSEMBLY FOR WINDOW REGULATOR

(71) Applicant: HI-LEX CONTROLS, INC., Rochester Hills, MI (US)

(72) Inventor: Shigeki Arimoto, Bloomfield Hills, MI (US)

(73) Assignee: HI-LEX CONTROLS, INC., Rochester Hills, MI (US)

(*) Notice: Subject to any disclaimer, the term of this patent is extended or adjusted under 35 U.S.C. 154(b) by 0 days.

(21) Appl. No.: 17/385,504

(22) Filed: Jul. 26, 2021

(65) Prior Publication Data

US 2023/0027803 A1    Jan. 26, 2023

(51) Int. Cl.
  *E05F 11/48*  (2006.01)
  *E05D 15/16*  (2006.01)
  *B60J 1/17*  (2006.01)

(52) U.S. Cl.
  CPC .............. *E05D 15/165* (2013.01); *B60J 1/17* (2013.01); *E05Y 2201/64* (2013.01)

(58) Field of Classification Search
  CPC ....... E05D 15/165; B60J 1/17; E05Y 2201/64
  USPC .................................... 49/374, 375
  See application file for complete search history.

(56) References Cited

U.S. PATENT DOCUMENTS

| | | | |
|---|---|---|---|
| 6,453,617 B1 * | 9/2002 | Klippert ................ | E05F 11/385 49/375 |
| 8,096,080 B2 | 1/2012 | Pavlovic et al. | |
| 8,453,383 B2 | 6/2013 | Barr et al. | |
| 8,756,866 B2 | 6/2014 | Lee | |
| 10,876,344 B2 | 12/2020 | Taubmann et al. | |
| 11,168,501 B2 * | 11/2021 | Pavlovic ................ | E05D 15/165 |
| 11,377,892 B2 * | 7/2022 | Hampel ................ | E05F 11/385 |
| 2004/0088924 A1 * | 5/2004 | Moser .................... | E05F 11/385 49/375 |
| 2007/0022665 A1 * | 2/2007 | Bigourden ............ | E05F 11/385 49/375 |
| 2010/0043297 A1 * | 2/2010 | Barr ...................... | E05F 11/385 24/458 |
| 2013/0152476 A1 | 6/2013 | Reno et al. | |
| 2018/0326820 A1 * | 11/2018 | Huang .................. | E05F 11/385 |
| 2020/0173212 A1 * | 6/2020 | Pavlovic .............. | E05F 11/385 |
| 2020/0248495 A1 * | 8/2020 | Magazzini ............... | B60J 1/17 |
| 2020/0338965 A1 * | 10/2020 | Barr ...................... | E05D 15/165 |
| 2020/0386026 A1 * | 12/2020 | Reames ................ | E05F 11/385 |

* cited by examiner

*Primary Examiner* — Jerry E Redman
(74) *Attorney, Agent, or Firm* — Dickinson Wright PLLC (57) ABSTRACT

A window regulator assembly in a vehicle includes a glass lift plate assembly for moving a window glass up and down along the guide rail. The glass lift plate assembly includes a slider base, a glass holder configured to receive and hold the window glass, and an attachment bracket placed on the glass holder to securely hold the window glass. The glass holder includes an inboard part and an outboard part, and is connected to the slider base by an adjustment member, which is configured to adjust a top edge of the window glass. Further, the window glass is placed between the inboard part and the outboard part of the glass holder and also fixedly held by an attachment fastener. The inboard part of the glass holder slidably moves relative to the outboard part of the glass holder by the rotational movement of the adjustment member.

20 Claims, 9 Drawing Sheets

GLASS LIFT PLATE ASSEMBLY FOR WINDOW REGULATOR

TECHNICAL FIELD

This present disclosure relates to a window regulator in a vehicle, and in particular, to an adjustable glass lift plate for a flameless window regulator in the vehicle.

BACKGROUND

The statements in this section merely provide background information related to the present disclosure and may not constitute prior art.

Window actuators, such as those for a vehicle window assemblies, are well-known. The window actuators typically utilize devices, known in the art as window regulators, to both lower and lift a window glass pane between a lower open position and an upper closed position. Further, a door window in the vehicle is typically held by window regulator lifter plate assemblies within the door assembly. In certain type of vehicle having a frameless door, such as convertibles, there is variation in the required position of the top edge of the door window, in order to achieve a seal with the roof. In addition, the frameless door of the vehicle does not possess the upper portion with a guide track for the window. In the window without the guide track, we have discovered that there is some natural variation in the position of the top edge of the door window due to manufacturing tolerances in the door assembly and in any other relevant components.

Further, when the door is open and the window pane is in the upper closed position, a person may push on the window pane to close the door. This causes the window pane to move or deflect laterally when the window pane is pushed. Due to the lateral deflection by the window pane, when the door is closed, the required position of the top edge of the door window is not correctly arranged along the side edge of the roof. Further, when the door is closed and the window pane is also in the upper closed position, the window without the guide track is designed to resist water infiltration at the junction of the window in the roofline. However, we have discovered that water is leaked through the junction of the window in the roofline because the top edge of the window does not correctly seal along the side edge of the roof.

In the design of the window regulator for the frameless window, it is normal practice to provide glass adjustment in the inboard/outboard and fore/aft directions. Normally, this can be achieved by adjustment of the guide rails, and also by the use of a glass clamp. Further, the tipping adjustment of the window glass in the vehicle having the frameless window can be made by a glass lift plate connected to the guide rails.

SUMMARY

The present disclosure relates to a window regulator assembly in a vehicle. In particular, the present disclosure relates to an adjustable glass lift plate assembly in the window regulator assembly for moving the window glass up and down in the vehicle. In a frameless window regulator, the glass lift plate assembly of the present disclosure is configured to adjust the top edge of the window glass. Further, the adjustable glass lift plate assembly for a window glass permits adjustment of the cross-car orientation (inboard and outboard) of the window glass such that the adjustable glass lift plate assembly of the present disclosure includes the cross-car orientation adjustment mechanism such as a rotational movement of the adjustment member.

According to an aspect of the present disclosure, a glass lift plate assembly for a window regulator in a vehicle includes a slider base having a first side and a second side, a glass holder being configured to receive and hold a window glass, and including an inboard part and an outboard part, an attachment bracket placed on the glass holder to securely hold the window glass between the inboard part and the outboard part of the glass holder, and an adjustment member fixed to the glass holder and rotatably connected to the slider base. The glass holder is arranged on the first side of the slider base. The adjustment member is configured to adjust a top edge of the window glass. Further, the inboard part of the glass holder slidably moves relative to the outboard part of the glass holder by a rotational movement of the adjustment member.

According to a further aspect of the present disclosure, the glass holder is folded to form a U-shape such that the folded glass holder has a space between the inboard part and the outboard part. The inboard part and the outboard part of the glass holder are each formed an inner surface defined in a plane such that, when the glass holder is folded, the inner surfaces of the inboard and outboard parts are faced and spaced with each other.

According to a further aspect of the present disclosure, the outboard part includes at least one slot formed through the thickness of the outboard part and the inboard part includes at least one hinge protruding from the inner surface of the inboard part such that, when the glass holder is folded, the hinge and the slot are engaged by a mechanical connection manner. The hinge engaged with the slot is configured to keep a space between the inboard part and the outboard part to facilitate installation of the window glass. Further, the slot has a longitudinal length greater than a width of the hinge such that the inboard part moves relative to the outboard part within the longitudinal length of the slot.

According to a further aspect of the present disclosure, the glass holder further includes a housing receiving a head portion of the adjustment member to connect the glass holder to the slider base. The head portion of the adjustment member is fixed inside the housing by an E-clip. The slider base includes a tab protruding from the first side of the slider base to connect with a body portion of the adjustment member.

According to a further aspect of the present disclosure, the attachment bracket is secured and fastened by an attachment fastener such that the window glass is held in a fixed position. The slider base includes an aperture, the glass holder includes an inboard hole and an outboard hole, and the window glass includes an opening such that the attachment fastener passes through the aperture, the inboard and outboard holes, and the opening to engage the attachment bracket.

According to a further aspect of the present disclosure, the outboard part of the glass holder includes an outer surface receiving the attachment bracket. The inboard part of the glass holder includes a curved outer surface placing on the first side of the slider base. The first side of the slider base is formed with a curved shape such that the curved outer surface of the inboard part in the glass holder comes in contact with the curved first side of the slider base. The inboard part of the glass holder moves relative to the outboard part of the glass holder along the curved first side of the slider base when the adjustment member is rotationally moved.

According to a further aspect of the present disclosure, when the adjustment member is rotationally moved up, the top edge of the window glass moves toward an outboard of the vehicle. When the adjustment member is rotationally moves down, the top edge of the window glass moves toward an inboard of the vehicle.

According to a further aspect of the present disclosure, the slider base is formed of a casting material such as an aluminum, the glass holder is formed of a plastic material, and the attachment bracket is formed of a steel material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
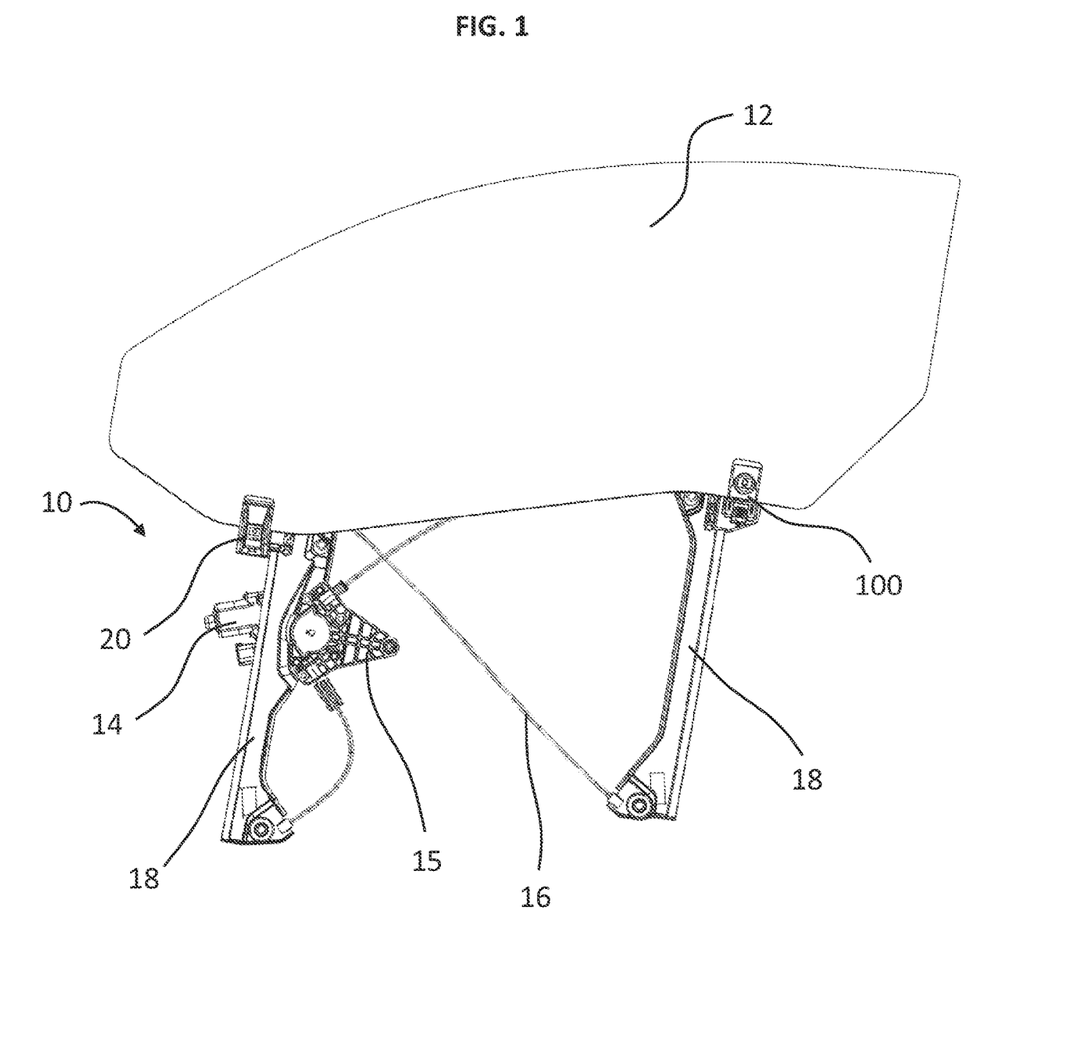
FIG. 1 shows a plan view of a window regulator assembly with a window glass in accordance with an embodiment of the present disclosure.

FIG. 1 shows a window regulator assembly 10 for moving a window glass 12 up and down in a vehicle. In accordance with an exemplary embodiment of the present disclosure, the window regulator assembly 10 includes a drive motor 14, drive cables 16, guide rails 18, a first glass lift plate assembly 100, and a second glass lift plate assembly 20. The first and second glass lift plate assemblies 100 and 20 are each connected to each of the guide rails 18 as shown in FIG. 1. Further, the drive motor 14 is mounted to a cable drum housing plate 15, and drives vertical movement of the first and second glass lift plate assemblies 100 and 20 on the guide rails 18 respectively by means of the drive cables 16.

Figure 1A:
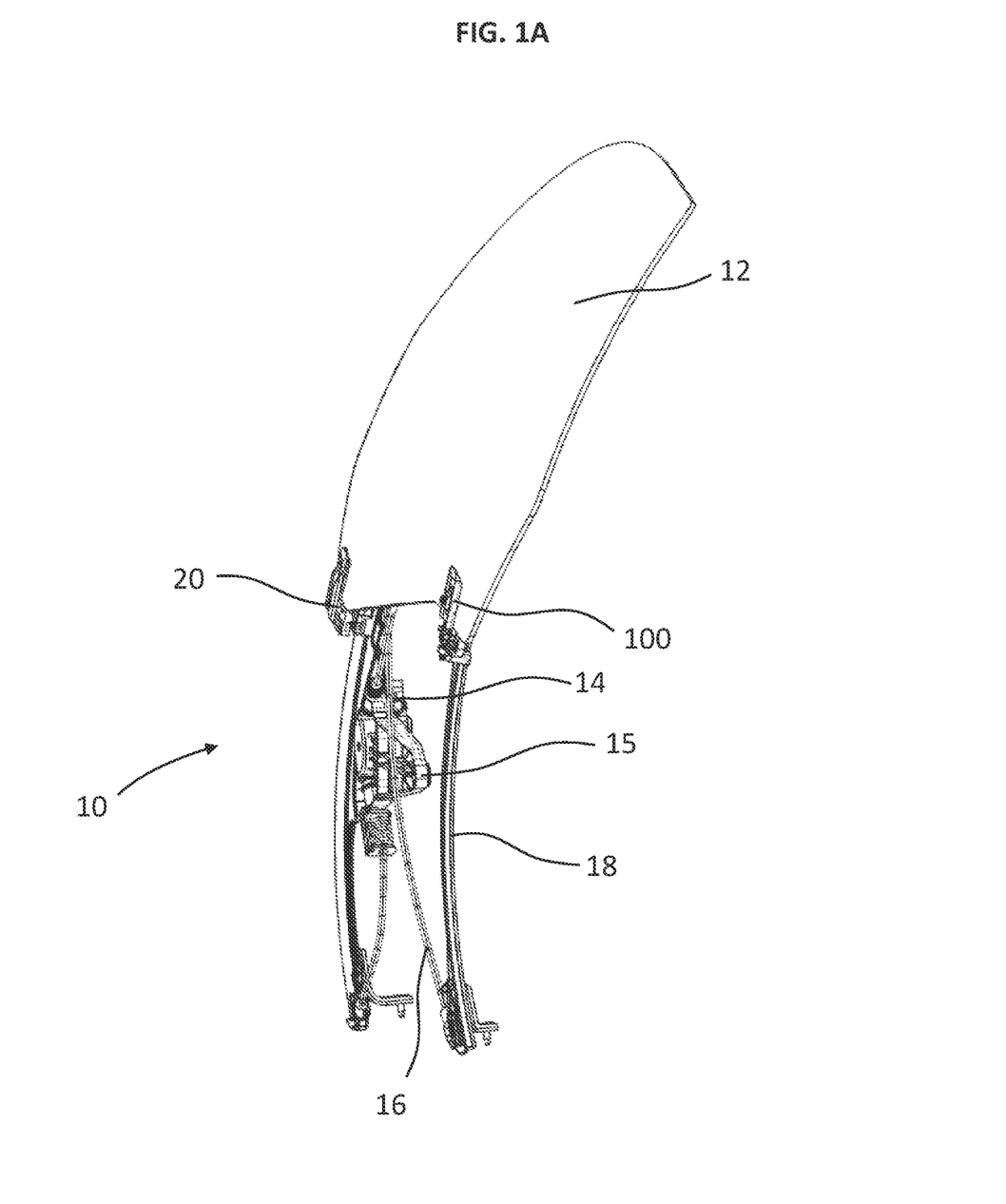
FIG. 1A shows a rear view of the window regulator assembly of FIG. 1.

As shown in FIG. 1, the first and second glass lift plate assemblies 100 and 20 are movably connected to each of the guide rails 18 for vertical movement thereon along a path such that the window regulator assembly 10 is configured to control the open and closed positions of the window glass 12. FIG. 1A shows a front view of the window regulator assembly 10 in the closed position of the window glass 12. In particular, in the closed position of the window glass 12 for a frameless window regulator as shown in FIGS. 1 and 1A, it is generally provided with tipping adjustments for the top edge of the window glass 12 in the inboard/outboard direction and also the fore/aft direction of the vehicle.

Figures 2, 2A:
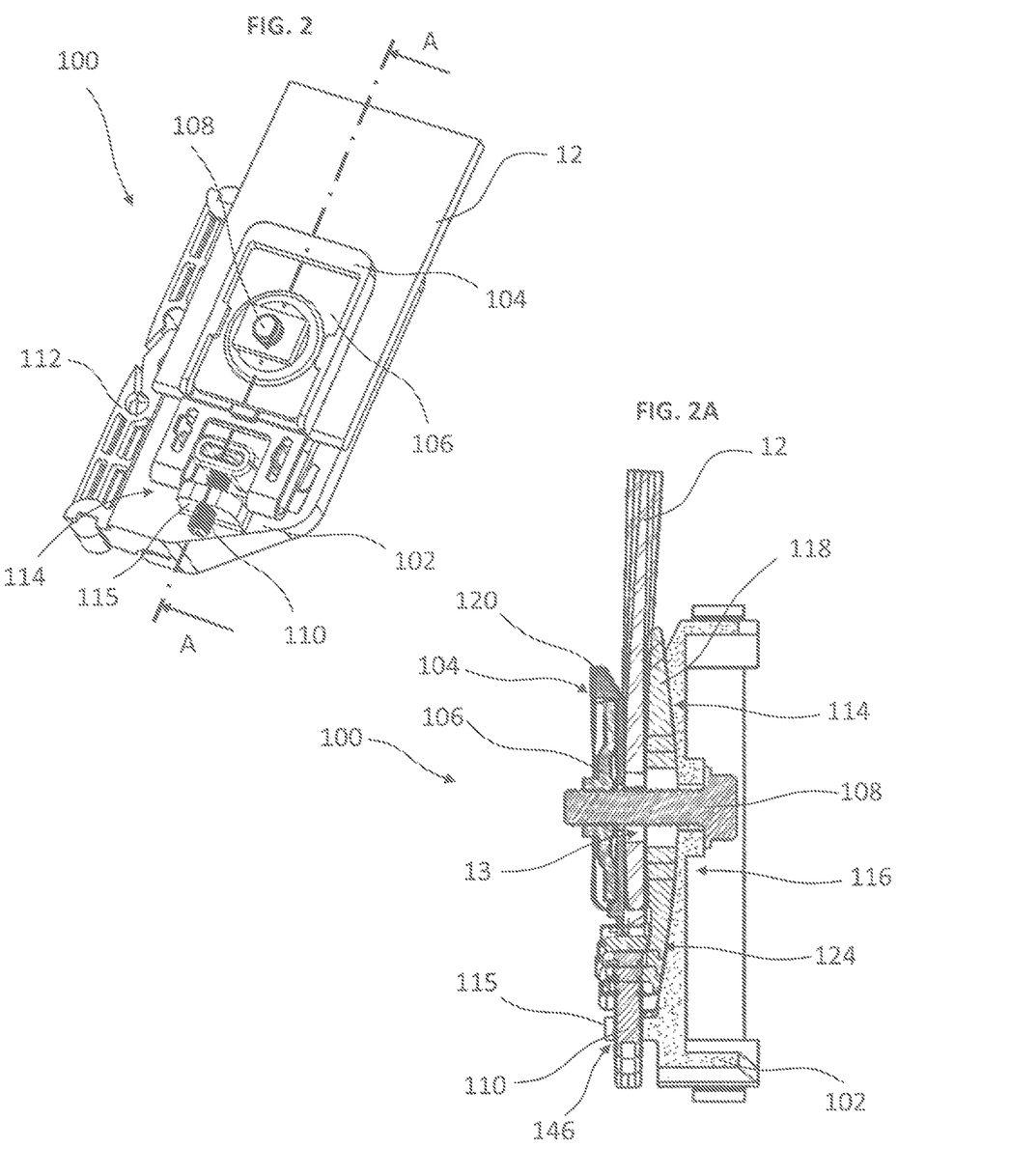
FIG. 2 shows a perspective view of a glass lift plate assembly in the window regulator assembly of FIG. 1.
FIG. 2A shows a cross-sectional view of the glass lift plate assembly, taken along a line A-A in FIG. 2.

Referring to FIG. 2, the first glass lift plate assembly 100 includes a slider base 102, a glass holder 104, a glass attachment bracket 106, and an attachment fastener 108. The glass lift plate assembly 100 further includes an adjustment member 110. As shown in FIG. 2, the glass lift plate assembly 100 includes a vertical movement guide 112 formed in the slider base 102 and slidably mounted to one of the guide rails 18 such that the slider base 102 of the glass lift plate assembly 100 is configured to move along the guide rails 18. The vertical movement guide 112 of the slider base 102 and the guide rail 18 may be formed with any suitable configuration. For example, the engagement portion of the guide rail 18 (not shown) is slidably engaged with the vehicle movement guide 112 formed in the slider base 102 such that the glass lift plate assembly 100 moves along the path of the guide rail 18. Further, the slider base 102 is formed with a tab 115 protruding from the slider base 102 to receive the adjustment member 110. The tab 115 of the slider base 102 is formed with a guide hole 146 such that the adjustment member 110 is rotatably engaged with the guide hole 146 of the tab 115 for adjusting the position of the top edge of the window glass 12.

In FIGS. 2 and 2A, the slider base 102 includes a first side 114 and a second side 116, and is made from any suitable material or combination of materials such as, for example, aluminum or a polymeric material. The slider base 102 is formed by a die casting process, but in another approach, the slider base 102 may be formed by other manufacturing processes. The first side 114 of the slider base 102 is formed with a curved shape and also receives the glass holder 104. As shown in FIG. 2A, for example, the first side 114 of the slider base 102 is formed with a concave shape to receive the glass holder 104. In another approach, the first side 114 of the slider base 102 may be formed with other shapes such as a flat shape to slidably engage the glass holder 104.

Figure 3A:
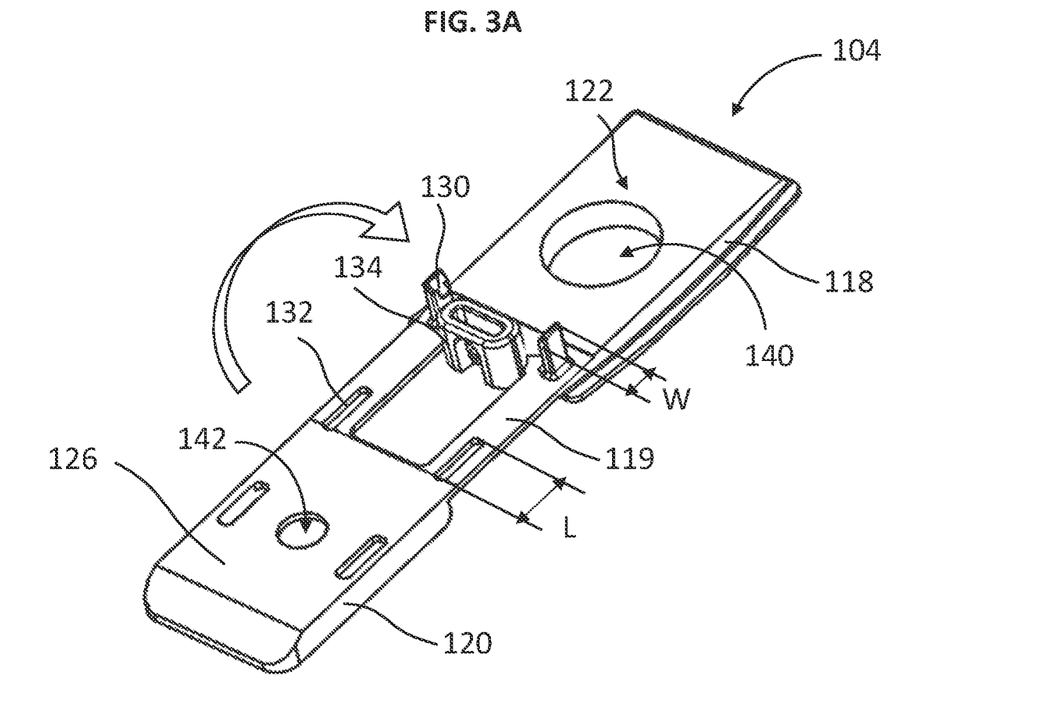
FIG. 3A shows a perspective view of a glass holder in the glass lift plate assembly of FIG. 2.
Figure 3B:
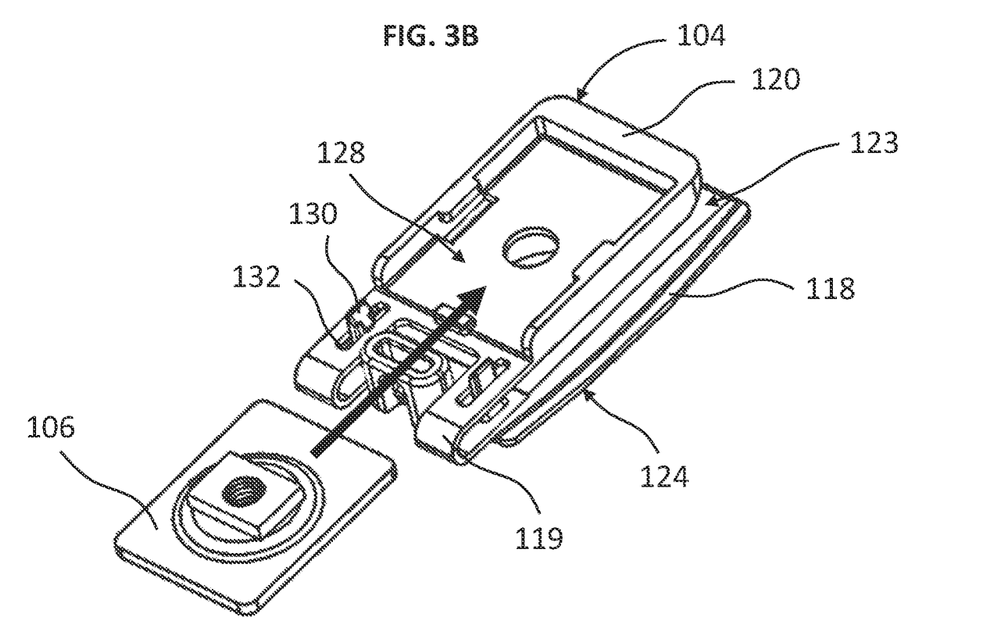
FIG. 3B shows a perspective view of an attachment bracket arranged in the glass holder of FIG. 3A.

Referring to FIGS. 3A and 3B, the glass holder 104 is formed with one piece and includes an inboard part 118, an outboard part 120, and a folded part 119. Further, the glass holder 104 is generally foldable along the folded part 119 (see an arrow in FIG. 3A) such that the inboard part 118 and the outboard part 120 are faced to each other as shown in FIG. 3B. In FIG. 3B, when the glass holder 104 is folded, the folded glass holder 104 is generally formed with a U-shape such that the glass holder 104 has a space 123 between the inboard part 118 and the outboard part 120 to receive and hold the window glass 12. As shown in FIGS. 2A, 3A, and 3B, each of the inboard part 118 and the outboard part 120 has an inner surface 122 and 126, and an outer surface 124 and 128. The inner surfaces 122 and 126 are each formed with a substantially flat shape defined as one plane, and when the glass holder 104 is folded, both the inner surfaces 122 and 126 are faced to each other and spaced to receive the window glass 12. As shown in FIG. 4A, however, the inner surfaces 122 and 126 of the glass holder 104 are each formed with a slightly curved shape to match the curvature of the window glass 12. Accordingly, the window glass 12 is placed and securely held inside the space 123 formed between the inboard part 118 and the outboard part 120 of the glass holder 104.

In FIG. 3A, the glass holder 104 includes at least one hinge 130 protruding from the inner surface 122 of the inboard part 118 and at least one slot 132 formed in the outboard part 120 such that, when it is folded, the hinge 130 and the slot 132 are engaged with each other by a mechanical connection manner such as a snap-fit. Accordingly, the hinge 130 engaged (or interlocked) with the slot 132 holds the inboard part 118 and the outboard part 120 together until the attachment fastener 108 is installed. As shown in FIG. 3B, further, the hinge 130 interlocked with the slot 132 keeps the space 123 formed between the inboard part 118 and the outboard part 120 to receive the window glass 12. In addition, the slot 132 formed in the outboard part 120 has a longitudinal length L, which is greater than the width W of the hinge 130 such that the inboard part 118 freely and slidably moves relative to the outboard part 120 within the slot 132 having the longitudinal length L.

Figures 3C, 3D:
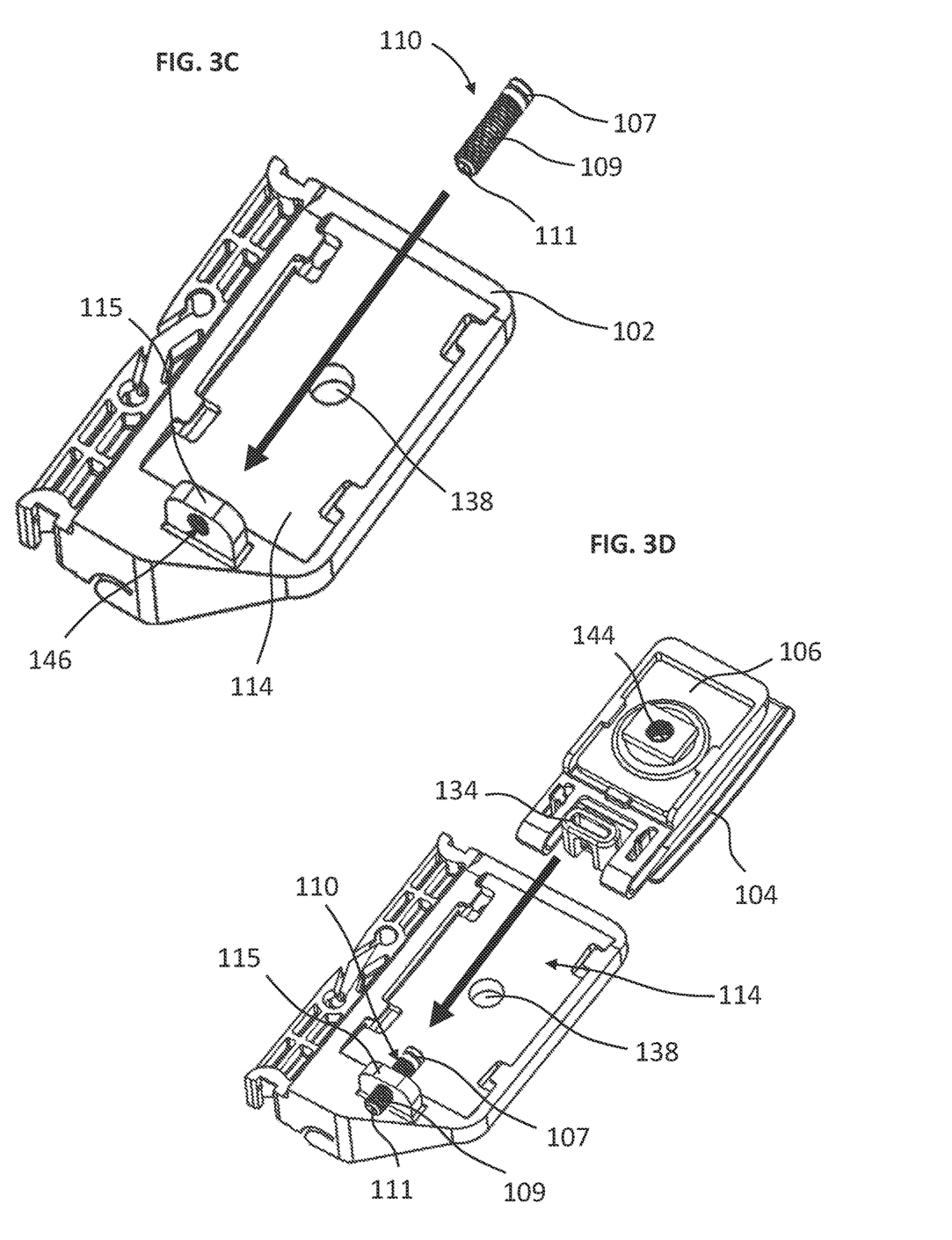
FIG. 3C shows a perspective view of a slider base with an adjustment member in the glass lift plate assembly of FIG. 2.
FIG. 3D shows a perspective view of the glass holder attached to the slider base in the glass lift plate assembly of FIG. 2.

The glass holder 104 further includes a housing 134 formed to receive the adjustment member 110 such as a screw type, and the glass holder 104 is connected with the slider base 102 by the adjustment member 110. In FIG. 3C, for example, the adjustment member 110 includes a head portion 107, a body portion 109, and a bottom portion 111. The head portion 107 of the adjustment member 110 is placed in the housing 134 and securely connected to the housing 134 of the glass holder 104 by installing an E-clip 136 (see FIG. 3E). The body portion 109 of the adjustment member 110 is formed with a thread to rotatably engage the guide hole 146 of the tab 115 of the slider base 102 such that the inboard part 118 of the glass holder 104 slidably moves up and down by the rotational movement of the adjustment member 110. Further, the bottom portion 111 of the adjustment member 110 is configured to adjust the top edge of the window glass 12 such that the assembly line operator can rotate the bottom portion 111 of the adjustment member 110 to adjust the tipping position of the top edge in the window glass 12.

The outboard part 120 of the glass holder 104 includes the outer surface 128 formed with a substantially flat shape to receive the glass attachment bracket 106. As shown in FIG. 3B, for example, the outer surface 128 of the outboard part 120 is formed with a slightly curved shape to match the curvature of the window glass 12 such that the glass attachment bracket 106 is also formed with a slightly curved shape for matching to the outer surface 128 of the outboard part 120. When the glass holder 104 is folded, the glass attachment bracket 106 is securely arranged on the outer surface 128 of the outboard part 120 formed in the glass holder 104. Further, the inboard part 118 of the glass holder 104 includes the outer surface 124 formed with a curved shape to place on the first side 114 of the slider base 102 (see FIG. 2A). The curved outer surface 124 of the inboard part 118 is located along the curved first side 114 of the slider base 102 such that the inboard part 118 is slidably move relative to the outboard part 120 along the curved first side 114 of the slider base 102. In FIG. 2A, for example, the outer surface 124 of the inboard part 118 is formed with a convex shape and the first side 114 of the slider base 102 is formed with a concave shape such that the outer surface 124 of the inboard part 118 comes fully or partly in contact with the first side 114 of the slider base 102. Accordingly, the slidable engagement between the inboard part 118 of the glass holder 104 and the slider base 102 allows the glass holder 104 to adjust the tipping point of the top edge in the window glass 12 by the rotational movement of the adjustment member 110. The glass holder 104 is generally made from a plastic material. The suitable plastic material reduces the likelihood of damage to the window glass 12 when the window glass 12 is placed in the space 123 between the inboard part 118 and the outboard part 120 and is securely held in the glass holder 104 by the attachment fastener 108 (see FIGS. 2A and 3E).

In FIG. 3B, the glass attachment bracket 106 is also placed on the outer surface 128 of the outboard part 120 to securely hold the window glass 12 by the attachment fastener 108 engaged with the attachment bracket 106. Further, the attachment fastener 108 passes through an aperture 138 of the slider base 102, an inboard hole 140 and an outboard hole 142 formed in the glass holder 104, and an opening 13 of the window glass 12 to be connected and tightened with the attachment bracket 106. Accordingly, the attachment bracket 106 securely and robustly holds the window glass 12 placed between the inboard part 118 and the outboard part 120 of the glass holder 104 (see FIGS. 2A and 3E). In addition, the attachment bracket 106 is generally made from a steel material and also formed with a threaded hole 144 to receive the attachment fastener 108 and securely hold the window glass 12.

FIGS. 3A-3E show the assembly process of the glass lift plate 100. In FIG. 3A, the glass holder 104 formed as one piece is folded to have a space 123 between the inboard part 118 and the outboard part 120. In another approach, the glass holder 104 may be formed with at least two pieces, which are connected to each other as a single unit. In FIG. 3A, when the glass holder 102 is folded, the hinge 130 of the inboard part 118 is engaged with the slot 132 of the outboard part 120 by a mechanical connection manner (e.g., snap-fitting or press-fitting), and keeps the space 123 to receive the window glass 12. In FIG. 3B, the attachment bracket 106 is placed on the outer surface 128 of the outboard part 120. After the window glass 12 is placed inside the space 123 formed between the inboard part 118 and the outboard part 120 of the glass holder 104, the attachment fastener 108 is coupled with the attachment bracket 106 (see FIGS. 2A and 3E). In FIG. 3C, the slider base 102 is formed with the tab 115 to couple with the adjustment member 110. The adjustment member 110 coupled with the guide hole 146 of the tab 115 is configured to adjust the tipping point of the top edge in the window glass 12 by the rotational movement of the adjustment member 110.

Figure 3E:
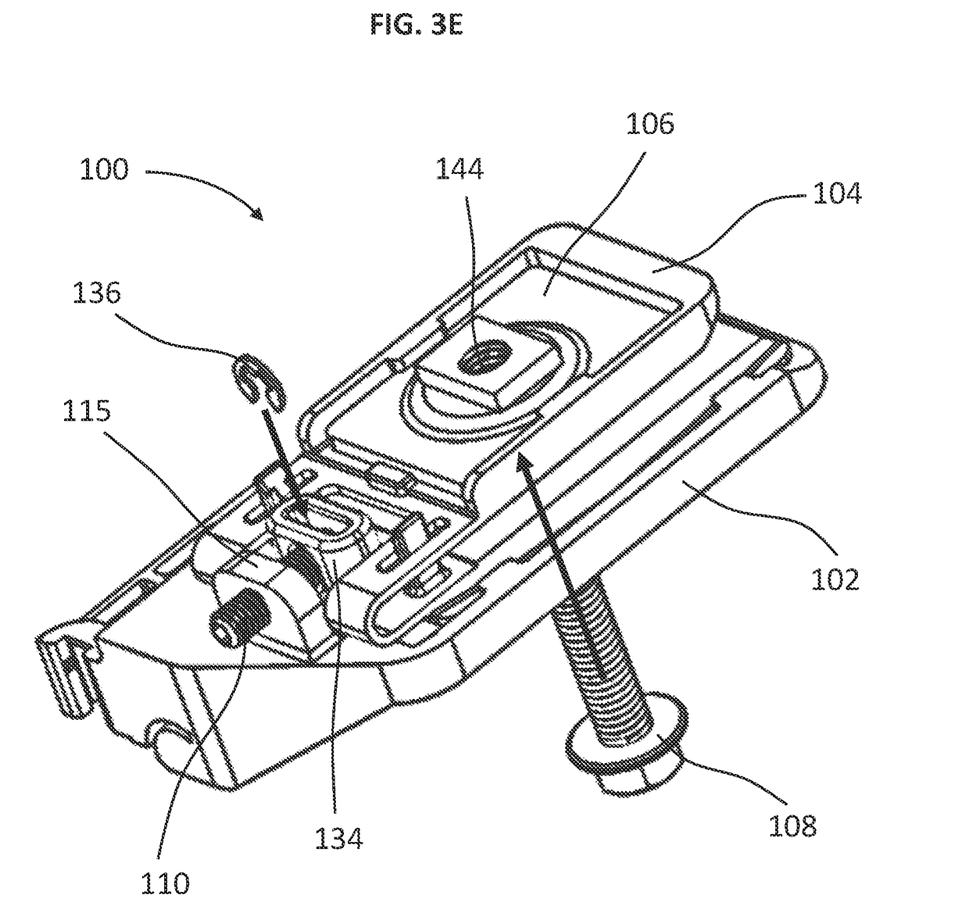
FIG. 3E shows a perspective view of a fastener and a E-clip attached to the glass lift plate assembly of FIG. 2.

In FIG. 3D, the glass holder 104 having the attachment bracket 106 is slidably located in the first side 114 of the slider base 102 and connected to the slider base 102 by the adjustment member 110. When the glass holder 104 is connected to the slider base 102, the housing 134 of the glass holder 104 is engaged with the head portion 107 of the adjustment member 110, which is engaged with the tab 115 of the slider base 102. In FIG. 3E, the E-clip 136 is coupled with the head portion 107 of the adjustment member 110 to securely fix the adjustment member 110 in the glass holder 104 such that the glass holder 102 with the attachment bracket 106 is connected to the slider base 102. After the window glass 12 is placed into the glass holder 104 (see FIG.

2A), the attachment fastener 108 passing through the aperture 138 of the slider base 102, the inboard and outboard holes 140 and 142 of the glass holder 104, and the opening 13 of the window glass 12 engages the threaded hole 144 of the attachment bracket 108 such that the window glass 12 is robustly held in the glass lift plate assembly 100.

Figure 4:
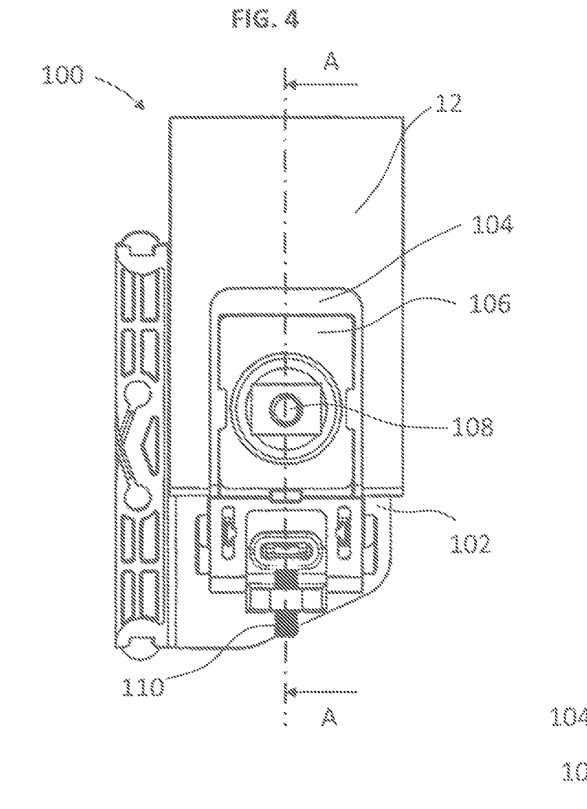
FIG. 4 shows a plan view of the glass lift plate assembly in a normal position of FIG. 2.
Figure 4A:
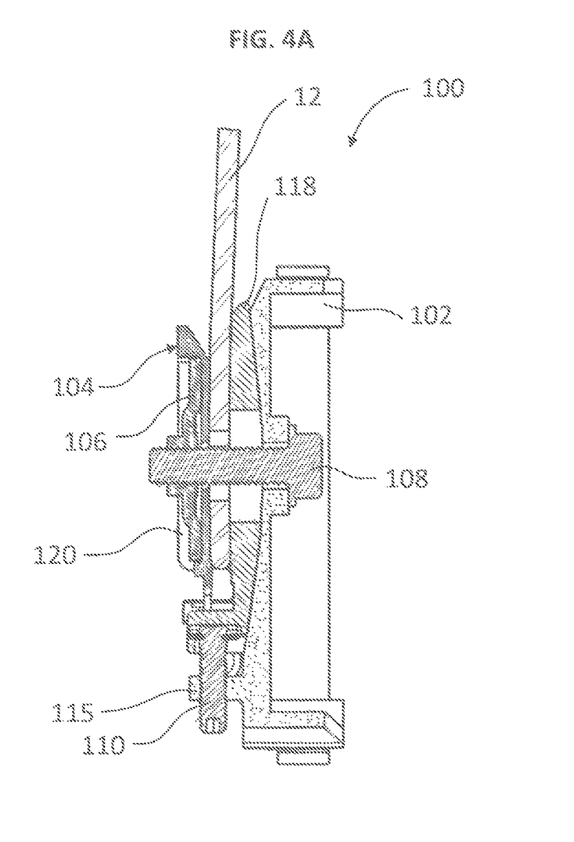
FIG. 4A shows a cross-sectional view of the glass lift plate assembly, taken along a line A-A of FIG. 4.
Figure 5:
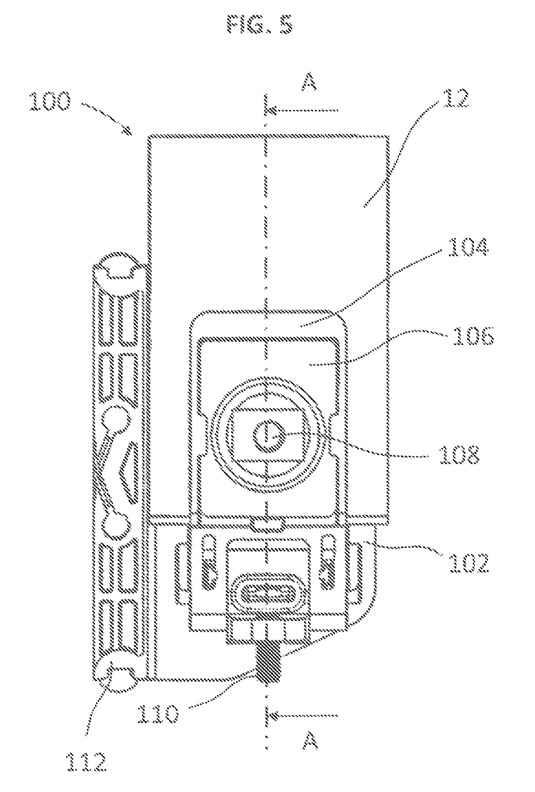
FIG. 5 shows a plan view of the glass lift plate assembly in a lowest position of the adjustment member of FIG. 2.
Figure 6:
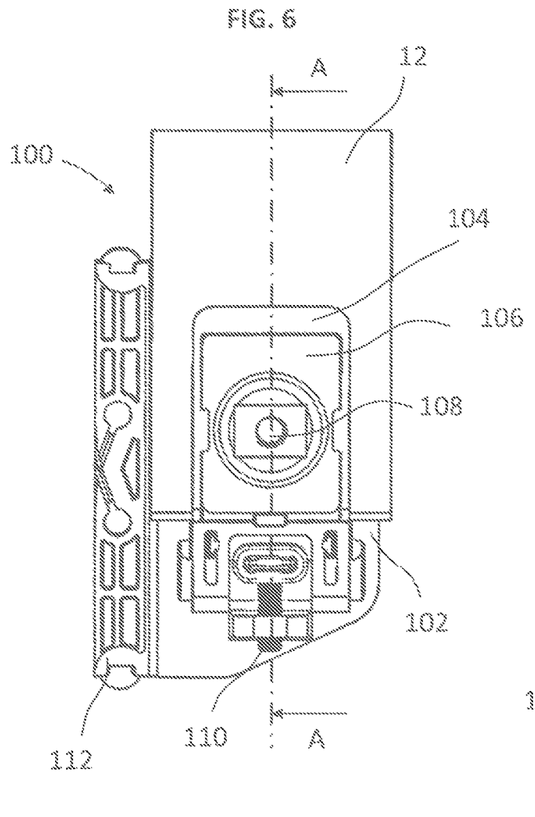
FIG. 6 shows a plan view of the glass lift plate assembly in a highest position of the adjustment member of FIG. 2.

FIGS. 4-6 show a tipping adjustment of the top edge in the window glass 12 held in the glass lift plate assembly 100 of the present disclosure. As shown in FIGS. 4-6, the tipping point (not shown) of the window glass 12 is adjusted by rotating the adjustment member 110, which is rotatably connected to the slider base 102. The inboard part 118 of the glass holder 104 arranged in the first side 114 of the slider base 102 slidably moves relative to the outboard part 120 of the glass holder 104 with the window glass 12 securely held with the attachment bracket 106 and fastener 108 in a fixed position. Accordingly, due to the relative movement between the inboard part 118 and the outboard part 120 of the glass holder 104, the glass lift plate assembly 100 is configured to adjust the tipping point of the window glass 12.

Figure 5A:
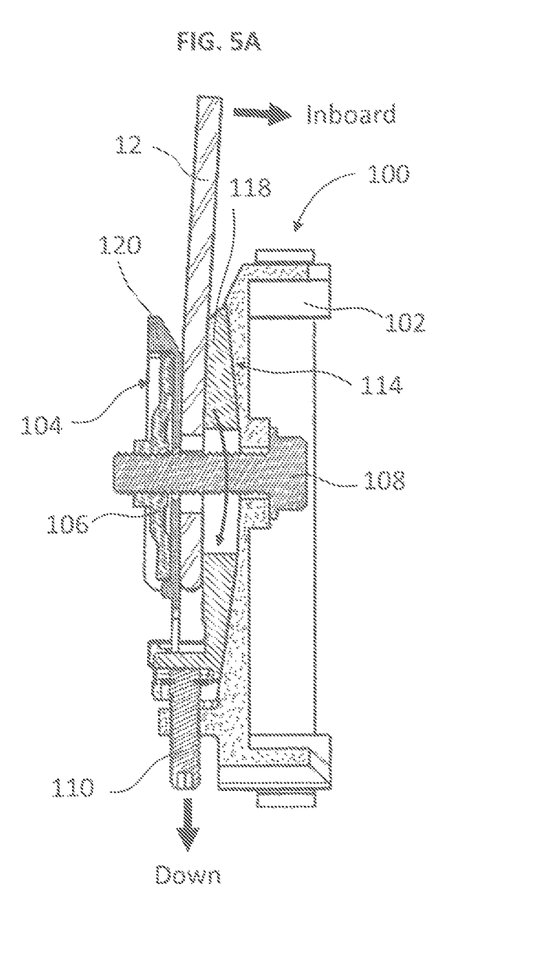
FIG. 5A shows a cross-sectional view of the glass lift plate assembly, taken along a line A-A of FIG. 5.
Figure 6A:
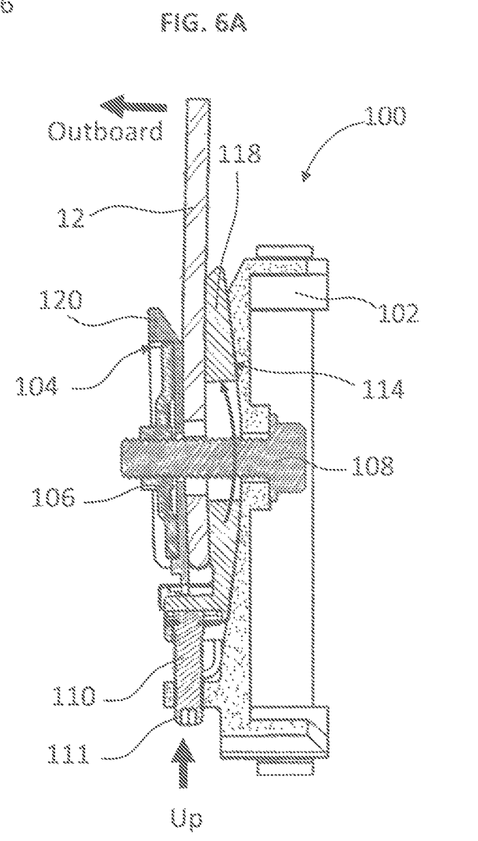
FIG. 6A shows a cross-sectional view of the glass lift plate assembly, taken along a line A-A of FIG. 6.

FIGS. 4 and 4A show a nominal position of the adjustment member 110 having a neutral tipping point of the window glass 12. In FIGS. 5 and 5A, when the adjustment member 110 is rotatably moved down from the nominal position, the inboard part 118 of the glass holder 104 slidably moves down along the curved shape of the first side 114 while the outboard part 120 of the glass holder 104 is held in the fixed position with the attachment fastener 108 connected to the attachment bracket 106 such that the tipping point of the top edge in the window glass 12 moves toward the inboard side of the vehicle. In FIGS. 6 and 6A, when the adjustment member 110 is rotatably moved up from the nominal position, the inboard part 118 of the glass holder 104 slidably moves up along the curved shape of the first side 114 while the outboard part 120 of the glass holder 104 is held in the fixed position with the attachment fastener 108 connected to the attachment bracket 106 such that the tipping point of top edge in the window glass 12 moves toward the outboard side of the vehicle.

As shown in FIGS. 4-6, the tipping point of the top edge in the window glass 12 mounted in the glass lift plate assembly 100 of the present disclosure can be adjusted in the assembly line of the window regulator assembly 10. The assembly line operator (not shown) easily accesses to the bottom portion 111 of the adjustment member 110 for adjusting the tipping point of the top edge in the window glass 12. Accordingly, the overall operating clearance required for movement of the glass holder 104 is reduced, which in turn facilitates its use in the restricted available space in the vehicle door assemblies. Further, the bottom portion 111 of the adjustment member 110 is also accessible by a suitable tool such that the assembly line operator easily adjusts the tipping point of the top edge in the window glass 12 to reduce the assembly time of the vehicle door. In accordance with an exemplary embodiment of the present disclosure, the window regulator assembly 10 and the window glass 12 are mounted in a vehicle door (not shown). Further, it has been understood that the window regulator assembly 10 having the glass lift plate assembly 100 of the present disclosure could be used with a window glass 12 that is not mounted in the door (e.g., a frameless door) such as a convertible vehicle.

While the above description constitutes the preferred embodiments of the present invention, it will be appreciated that the invention is susceptible to modification, variation and change without departing from the proper scope and fair meaning of the accompanying claims.

What is claimed is:

1. A glass lift plate assembly for a window regulator in a vehicle, the glass lift plate assembly comprising:
   a slider base including a first side and a second side;
   a glass holder configured to receive and hold a window glass, the glass holder including an inboard part and an outboard part, the glass holder arranged on the first side of the slider base;
   an attachment bracket placed on the glass holder to securely hold the window glass between the inboard part and the outboard part of the glass holder; and
   an adjustment member fixed to the glass holder and rotatably connected to the slider base, the adjustment member configured to adjust a top edge of the window glass,
   wherein the inboard part of the glass holder slidably moves relative to the outboard part of the glass holder by a rotational movement of the adjustment member.

2. The glass lift plate assembly of claim 1, wherein the glass holder is folded to form a U-shape such that the folded glass holder has a space between the inboard part and the outboard part.

3. The glass lift plate assembly of claim 1, wherein the inboard part and the outboard part of the glass holder are each formed with an inner surface defined in a plane such that, when the glass holder is folded, the inner surfaces of the inboard and outboard parts are faced and spaced with each other.

4. The glass lift plate assembly of claim 1, wherein the outboard part includes at least one slot formed through a thickness of the outboard part and the inboard part includes at least one hinge protruding from an inner surface of the inboard part such that, when the glass holder is folded, the hinge and the slot are engaged by a mechanical connection manner.

5. The glass lift plate assembly of claim 4, wherein the hinge engaged with the slot is configured to keep a space between the inboard part and the outboard part to facilitate installation of the window glass.

6. The glass lift plate assembly of claim 4, wherein the slot has a longitudinal length greater than a width of the hinge such that the inboard part moves relative to the outboard part within the longitudinal length of the slot.

7. The glass lift plate assembly of claim 1, wherein the glass holder further includes a housing receiving a head portion of the adjustment member to connect the glass holder to the slider base.

8. The glass lift plate assembly of claim 7, wherein the head portion of the adjustment member is fixed inside the housing by an E-clip.

9. The glass lift plate assembly of claim 1, wherein the slider base includes a tab protruding from the first side of the slider base to connect with a body portion of the adjustment member.

10. The glass lift plate assembly of claim 1, wherein the attachment bracket is secured and fastened by an attachment fastener such that the window glass is held in a fixed portion.

11. The glass lift plate assembly of claim 10, wherein the slider base includes an aperture, the glass holder includes an inboard hole and an outboard hole, and the window glass includes an opening such that the attachment fastener passes through the aperture, the inboard and outboard holes, and the opening to engage the attachment bracket.

12. The glass lift plate assembly of claim 1, wherein the outboard part of the glass holder includes an outer surface receiving the attachment bracket.

13. The glass lift plate assembly of claim 1, wherein the inboard part of the glass holder includes a curved outer surface placing on the first side of the slider base.

14. The glass lift plate assembly of claim 13, wherein the first side of the slider base is formed with a curved shape such that the curved outer surface of the inboard part in the glass holder comes in contact with the first side of the slider base.

15. The glass lift plate assembly of claim 14, wherein the inboard part of the glass holder moves relative to the outboard part of the glass holder along the first side of the slider base when the adjustment member is rotationally moved.

16. The glass lift plate assembly of claim 1, wherein when the adjustment member is rotationally moved up, the top edge of the window glass moves toward an outboard of the vehicle.

17. The glass lift plate assembly of claim 1, wherein when the adjustment member is rotationally moved down, the top edge of the window glass moves toward an inboard of the vehicle.

18. The glass lift plate assembly of claim 1, wherein the slider base is formed of a casting material such as an aluminum.

19. The glass lift plate assembly of claim 1, wherein the glass holder is formed of a plastic material.

20. A glass lift plate assembly for a window regulator in a vehicle, the glass lift plate assembly comprising:
  a slider base including a first side and a second side;
  a glass holder configured to receive and hold a window glass, the glass holder including an inboard part and an outboard part, the glass holder arranged on the first side of the slider base;
  an attachment bracket placed on the glass holder to securely hold the window glass between the inboard part and the outboard part of the glass holder; and
  an adjustment member fixed to the glass holder and rotatably connected to the slider base, the adjustment member configured to rotationally move up and down,
  wherein a top edge of the window glass is adjusted by a relative movement between the inboard part and the outboard part of the glass holder securely connected with the adjustment member.

* * * * *